Figure 1:
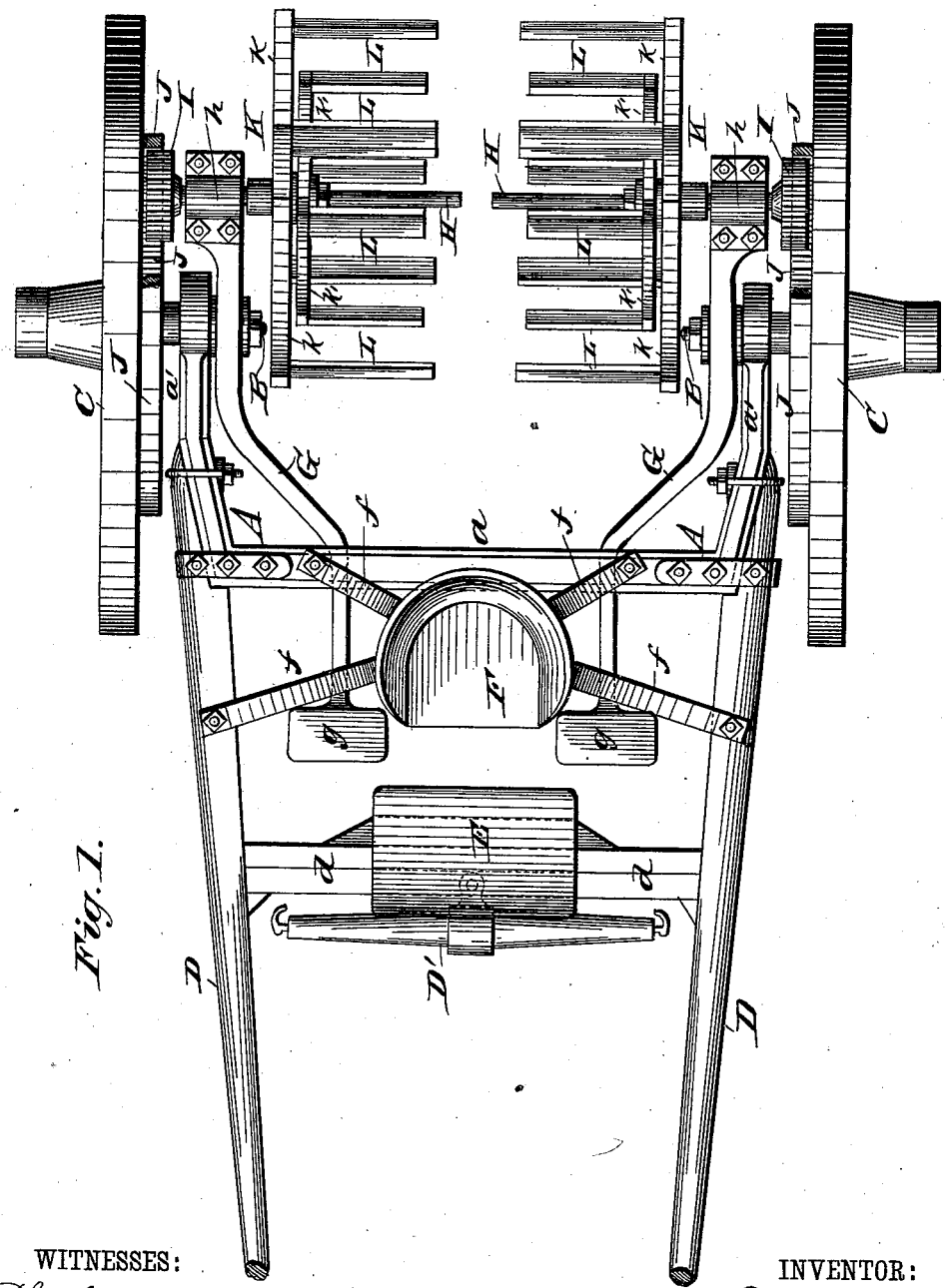

(No Model.) 2 Sheets—Sheet 1.

J. P. LOCKWOOD.
COTTON STALK CUTTER.

No. 372,858. Patented Nov. 8, 1887.

WITNESSES:
Phil. C. Dieterich
C. Sedgwick

INVENTOR:
J. P. Lockwood
BY Munn & Co
ATTORNEYS.

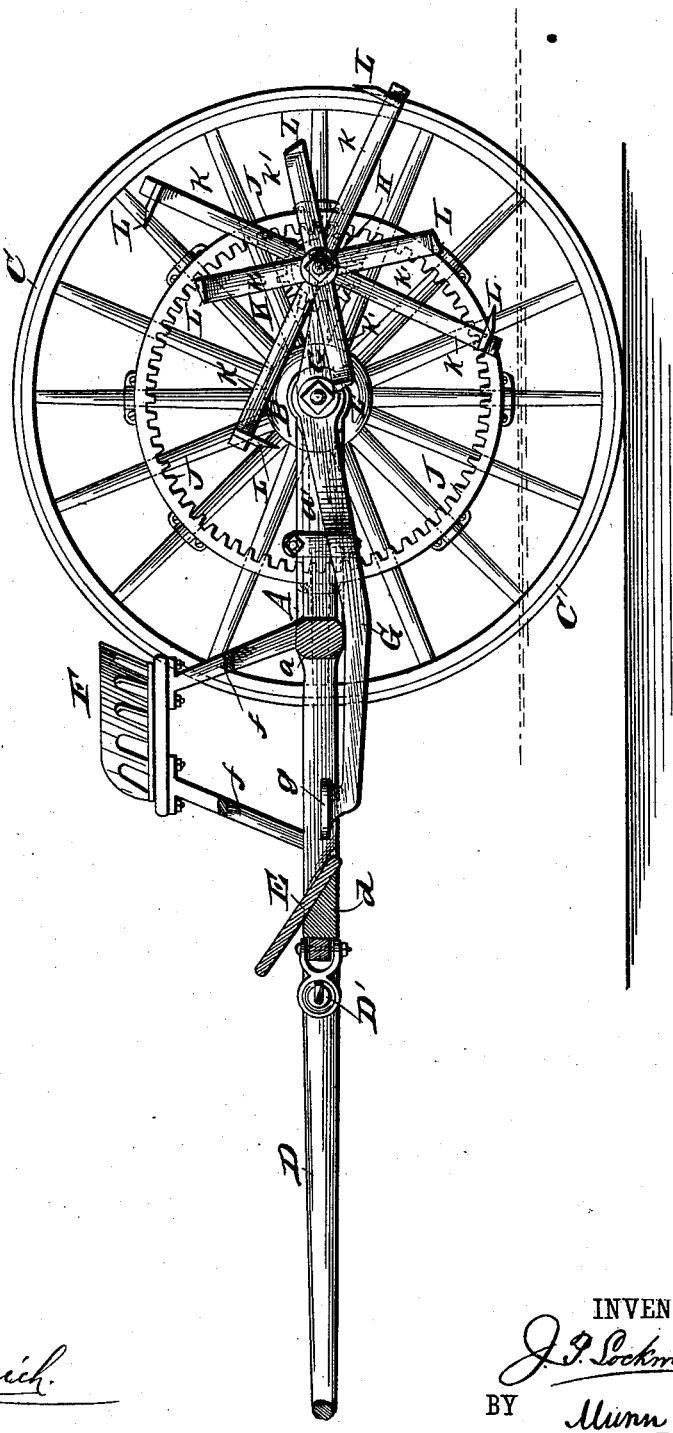

UNITED STATES PATENT OFFICE.

JOHN PALMER LOCKWOOD, OF CHARLESTON, SOUTH CAROLINA.

COTTON-STALK CUTTER.

SPECIFICATION forming part of Letters Patent No. 372,858, dated November 8, 1887.

Application filed August 19, 1887. Serial No. 247,363. (No model.)

*To all whom it may concern:*

Be it known that I, JOHN PALMER LOCKWOOD, of Charleston, in the county of Charleston and State of South Carolina, have invented a new and Improved Cotton-Stalk Cutter, of which the following is a full, clear, and exact description.

My invention relates to a machine adapted to cut down stalks or plants, particularly cotton-stalks, left standing after harvest; and the invention has for its object to provide a simple, effective, and durable machine of this character, whereby standing stalks or plants may be cut down and severed into pieces, allowing all to be plowed under easily when preparing the land for the next crop.

The invention consists in certain novel features of construction and combinations of parts of the stalk-cutter, all as hereinafter fully described and claimed.

Reference is to be had to the accompanying drawings, forming a part of this specification, in which similar letters of reference indicate corresponding parts in both the figures.

Figure 1 is a plan view of my improved stalk-cutter with parts broken away and in section, and Fig. 2 is a side elevation thereof with the sulky-frame partly in section.

The sulky on which the stalk-cutting mechanism is supported is made with a frame, A, consisting of a cross-bar, $a$, and two arms, $a'$ $a'$, which project rearwardly from opposite ends of the bar, and in the extremities of which are held the short axles B B, on which the sulky-wheels C C are journaled. To the frame A are bolted the back ends of the sulky shafts or thills D D, which are connected a little forward of the frame by a cross-bar, $d$, to which is fixed a foot-board, E, for the accommodation of a driver or attendant seated on a seat, F, which is supported at suitable height by bars $f$, fixed to the seat and to the frame A and thills D D. A whiffletree, D', attached to the thill cross-bar $d$, provides for hitching a horse or mule to the sulky; but two or more animals may be hitched to the machine, if required.

The wheel-axles B B extend far enough inside the sulky-frame to allow levers G G to be fulcrumed on them, and to the back end of each lever G is journaled in a suitable bearing, $h$, a shaft, H, to the outer end of which is fixed a toothed pinion, I, which meshes with an internal gear-wheel or circular rack, J, fixed to the inner face of the adjacent sulky-wheel C, whereby the pinions and shafts I H at each side of the sulky will be rotated by the advance of the machine.

To each of the shafts H, next its bearing $h$, is fixed a cutter-holding frame, K, consisting, preferably, of two long bars, $k\,k$, crossed at the center where they are fixed to the shaft, and two shorter bars, $k'\,k'$, also crossed at the center and fixed to the shaft and radiating therefrom in planes between the longer bars, $k\,k$. Each of the bars $k\,k'$ carries at each end a laterally-projecting stiff cutter, L, which, as the frame K rotates, cuts the standing cotton-plants. The shafts H H of the opposite frames K K are extended through and project laterally from the frames about as far or a little farther than the cutters L, and these inwardly-projecting parts of the shafts hold any of the stalks which may by chance first escape the cutters to assure resistance of these stalks to the knives until they are cut off by them. The cutters not only sever the plants at a point about four to six inches from the ground, but the arrangement of the cutters on the longer and shorter bars, $k\,k'$, or one series acting at points nearer the shafts H than the other series, assures also the cutting of the severed stalks into comparatively short pieces, which, with the short stumps left standing, may be easily plowed under when preparing the land to receive the next crop.

The long arms of the levers G G extend forward of and to opposite sides of the driver's seat F, where they are provided with foot-plates $g\,g$, which, when depressed by the driver, will swing the levers on their fulcrum-shafts B, and will raise the cutter-frames and cutters K L either at one or both sides of the machine, as may be required, to avoid obstructions in the field, such as projecting rocks or stumps. The raising of the cutter-frames and cutters does not ungear them from the sulky-wheel racks J; hence the cutters are always ready for action on the plants when they are allowed to fall by removing the foot or feet from the plates $g$ of the levers.

In operating the machine the cutters L of each of the two frames K will sever and cut up a row of cotton-stalks, whereby two rows of stalks will be cut down by one traverse of the machine across the field, and the work will be accomplished with great economy of time and labor over that required to beat down the stalks by sticks wielded by field-hands, as will readily be understood.

Having thus described my invention, what I claim as new, and desire to secure by Letters Patent, is—

1. The combination, in a cotton-stalk cutter, of a sulky having wheels C C, each provided with a toothed rack, J, a lever, G, fulcrumed on each sulky-wheel shaft, a shaft journaled on each lever G and carrying a rotating frame, K, provided with inwardly or laterally projecting cutters, and pinions I on the cutter-frame shafts and engaging the racks J of the sulky-wheels, substantially as shown and described, whereby the two separate cutter-frames rotated simultaneously by the sulky-wheels may be raised or lowered at will and independently of each other by operating their levers G, substantially as herein set forth.

2. The combination, in a cotton-stalk cutter, of a sulky having wheels C C, each provided with a rack, J, a lever, G, fulcrumed on each wheel-shaft, a shaft, H, journaled on each lever G, and a frame, K, on each shaft H and provided with lateral cutters L, pinions I on the cutter-frame shafts and engaging the racks J of the sulky-wheels, substantially as described, for the purposes set forth.

3. In a cotton-stalk cutter, the combination, with a shaft, H, carrying a pinion and driven by a rack on the sulky-wheel, substantially as specified, of a cutter-frame, K, consisting of radial arms $k\ k'$, carrying laterally-projecting cutters L, substantially as described, for the purposes set forth.

JOHN PALMER LOCKWOOD.

Witnesses:
JNO. W. ROBINSON,
F. B. HACKER.